United States Patent [19]
Cadiou

[11] 3,813,151
[45] May 28, 1974

[54] SEATS HAVING HEAD-RESTS
[75] Inventor: Jean G. Cadiou, Paris, France
[73] Assignee: Societe Anonyme Automobiles Citroen, Paris, France
[22] Filed: Sept. 25, 1972
[21] Appl. No.: 292,250

[30] Foreign Application Priority Data
Sept. 28, 1971 France .............................. 71.35577

[52] U.S. Cl. ................................ 297/396, 297/410
[51] Int. Cl. ........................... A47c 7/36, B60n 1/06
[58] Field of Search ................ 297/61, 85, 396, 410

[56] References Cited
UNITED STATES PATENTS
3,014,757   12/1961   Pitcher et al. ........................ 297/85
3,454,303    2/1969   Dangauthier ....................... 297/396
3,462,193    8/1969   Tamura ........................... 297/396 X

*Primary Examiner*—Casmir A. Nunberg
*Attorney, Agent, or Firm*—Eyre, Mann & Lucas

[57] ABSTRACT

The back part of a vehicle seat includes a retractable head rest located in an opening in the upper portion of the back part. When the head rest is in its raised position, an auxiliary cushion covers the opening.

7 Claims, 13 Drawing Figures

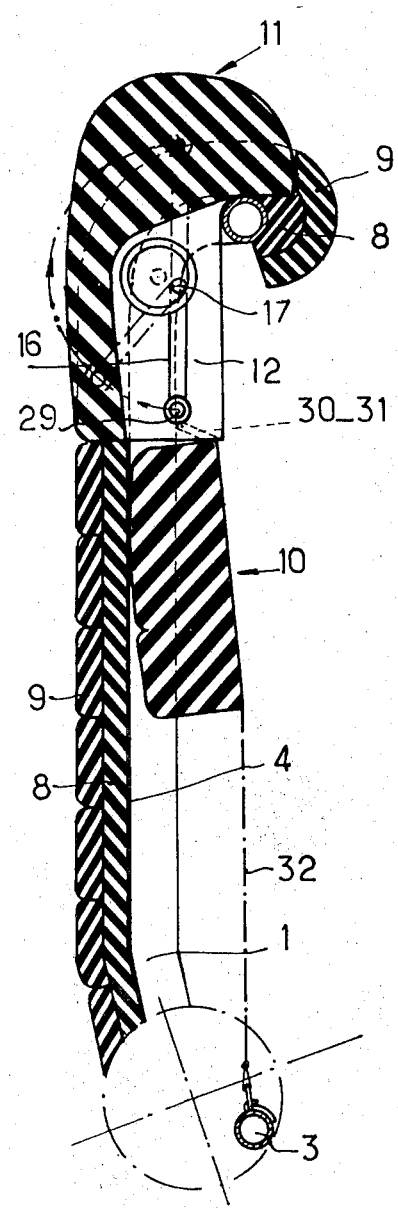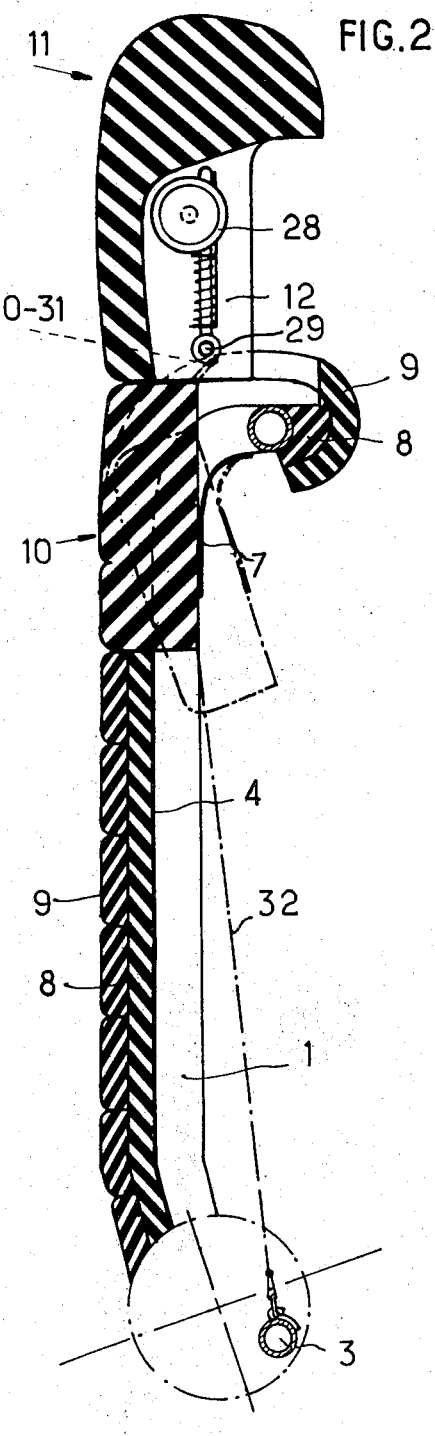

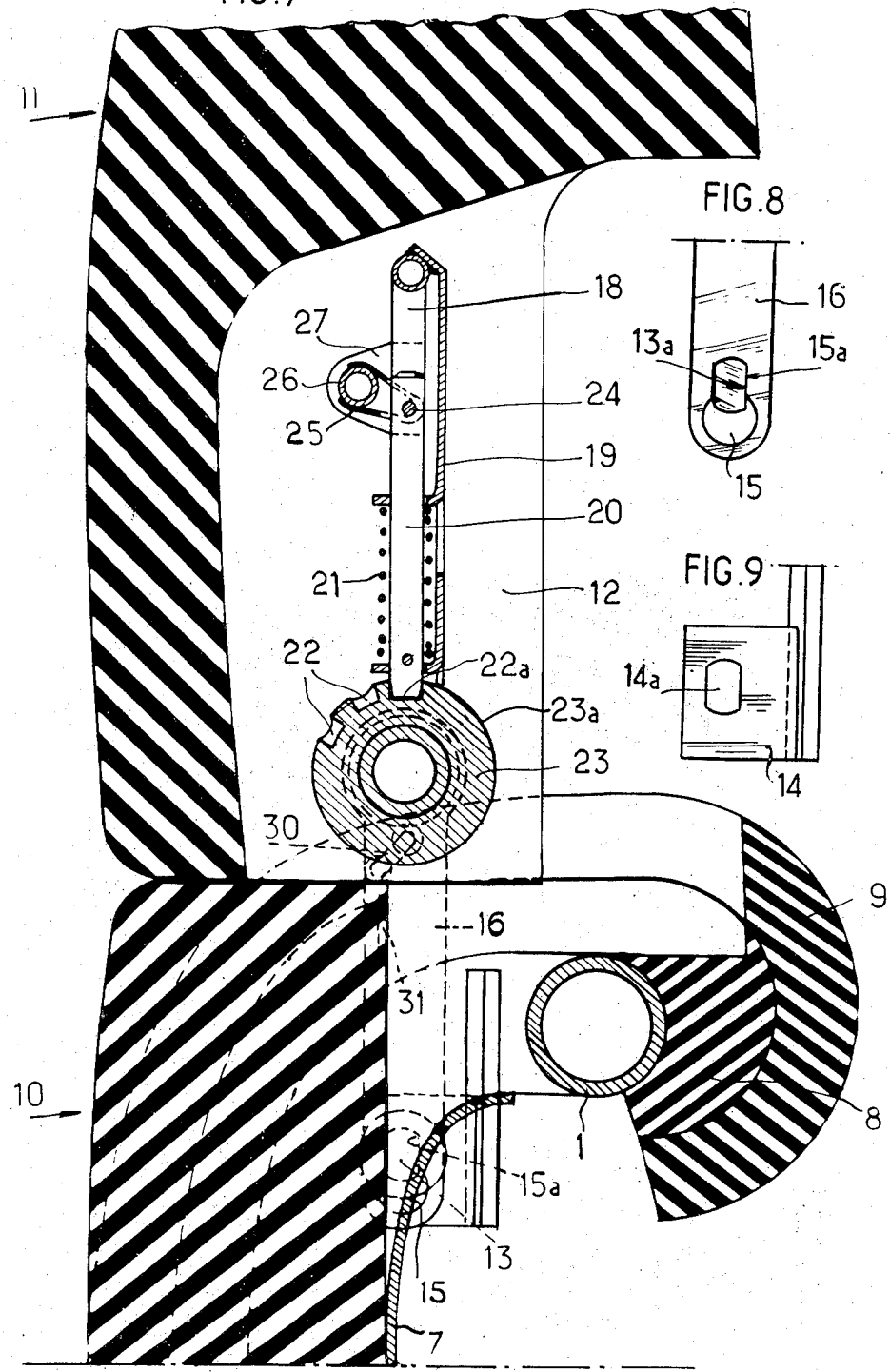

SEATS HAVING HEAD-RESTS

BACKGROUND OF THE INVENTION

1. Field of the Invention

The present invention relates to seats.

2. Description of the Prior Art

It has been proposed to provide the back part of a seat with a central opening in its upper part, a portion of the back part being movable between a lowered position in which it closes this opening, and a raised position in which it is at least partly removed from the opening and forms a headrest.

When the movable portion is in its lowered position, it merges with the back part, but when it is in its raised position, it leaves in the back part an empty space which is liable to provide a degree of discomfort to the seat occupant.

SUMMARY OF THE INVENTION

According to the present invention there is provided in a back part of a seat means defining a central opening in its upper part, a portion movable between a lowered position in which the said portion covers the opening and a raised position in which the said portion is at least partly withdrawn from the opening to define a head-rest, and an auxiliary cushion connected to the said movable portion, the said auxiliary cushion being retracted behind the back part when the said movable portion is in its lowered position said auxiliary cushion covering the opening when the said movable portion is in its raised position.

The upper part of the auxiliary cushion can be connected with the base portion of the movable portion by clamps, straps or similar devices, while its lower part is connected by means of resilient members to the base portion of the back part. The connection of the cushion with the movable section of the back part is thus particularly simple; moreover, the resilient members have a tendency to hold the cushion behind the back part and to hold the head-rest in an inconspicuous position, so that it is merely sufficient to provide means for locking the head-rest in its raised position. When these means are released, the head-rest and the auxiliary cushion return automatically to their lowered position.

In a preferred embodiment of the invention, the movable portion is pivotably mounted in relation to a stirrup or a system of rods, and has releasable locking means for locking the movable portion in relation to said stirrup or rod system when the locking portion is in its raised position. The stirrup or rod system is itself pivotably mounted in relation to the back part and has releasable locking means for locking it in the position that it occupies when the movable portion is in its raised position.

BRIEF DESCRIPTION OF THE DRAWINGS

An embodiment of the invention will now be described, by way of example only, with reference to the accompanying diagrammatic drawings in which:

FIG. 1 is a vertical section of a seat back part, in accordance with the invention, a head-rest of the back part being shown in a lowered position;

FIG. 2 is a section similar to that of FIG. 1, but showing the head-rest in its raised position;

FIG. 7 is a vertical section of the head-rest; and

FIGS. 8 and 9 are elevations of parts of the head-rest.

DESCRIPTION OF THE PREFERRED EMBODIMENT

Figure 3:
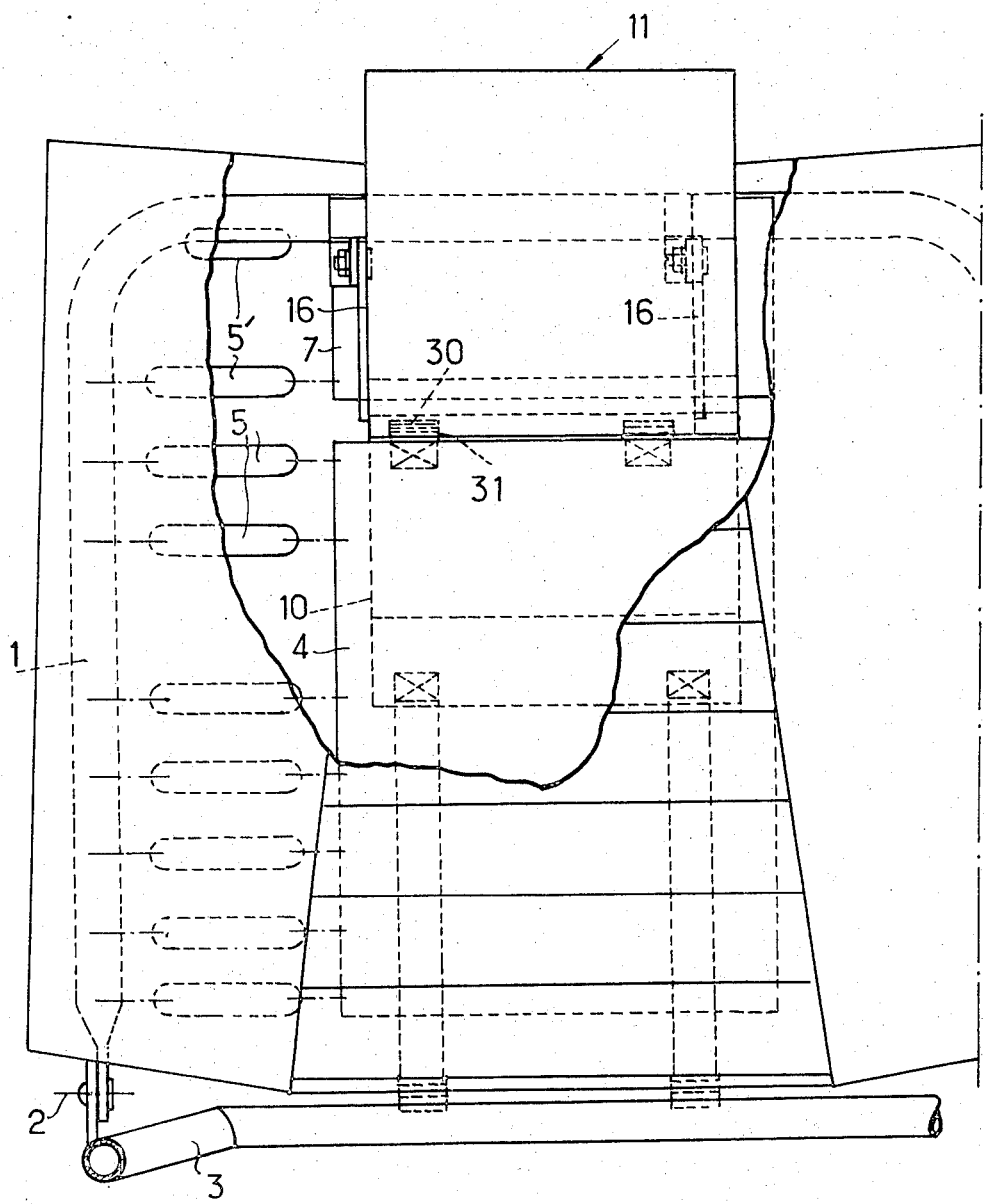
FIG. 3 and FIG. 4 are fragmentary front elevations of the back part, respectively showing the head-rest in its lowered and raised positions.
Figure 4:
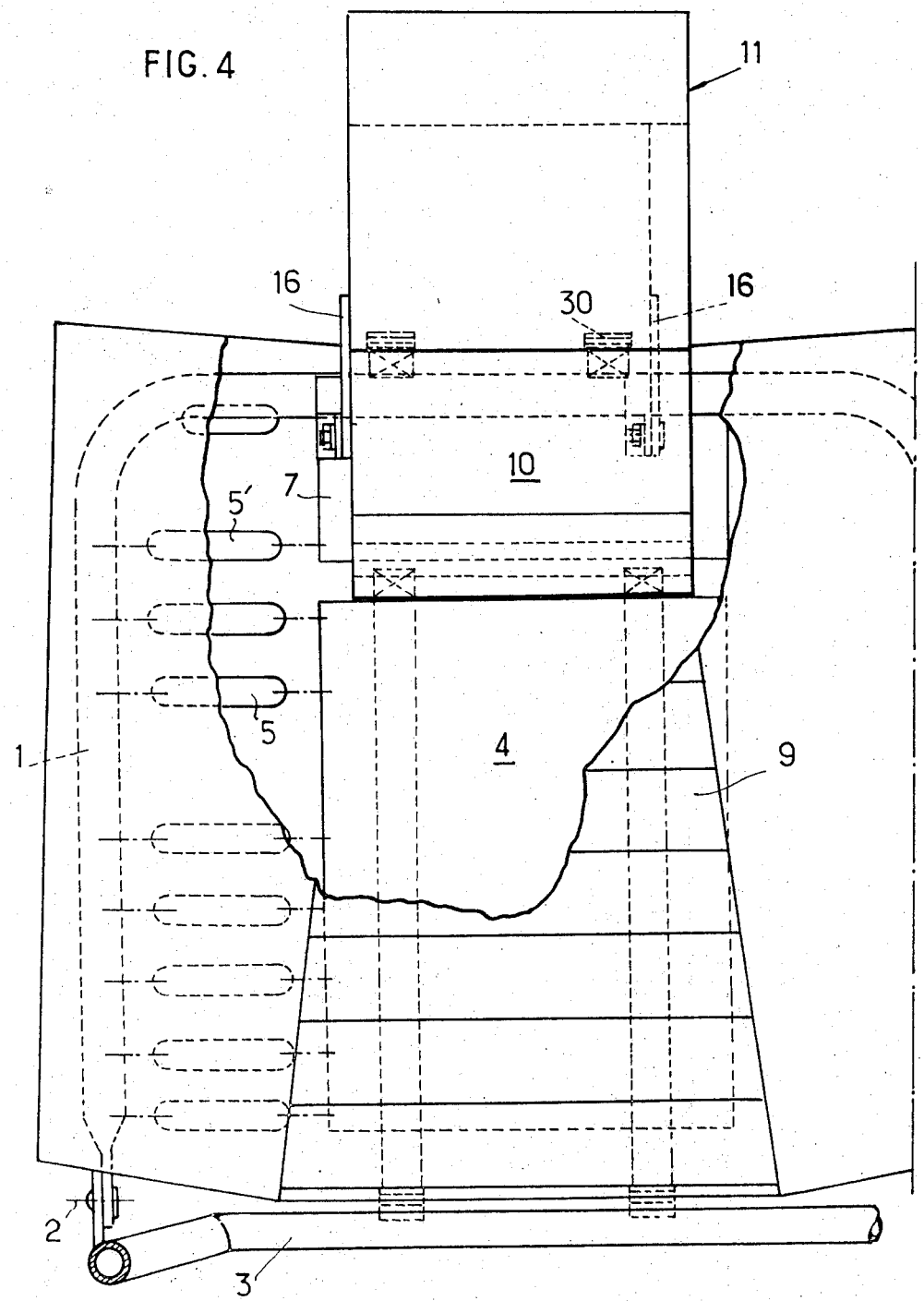

As shown in the drawings, the back part of a vehicle seat comprises a tubular U-shaped frame 1 pivotally mounted about an axis 2 on a frame 3 of the seat. A piece of fabric 4 which terminates at a certain distance from the upper edge of the back part is connected to the frame 1 by means of resilient straps 5 formed, for example, by rubber rings; as can be seen in FIG. 1, the fabric 4 is substantially located in the forward plane of the frame 1. A second piece of fabric 7 is arranged above the fabric 4 and is located substantially in the rear plane of the frame; the fabric 7 is connected to the frame 1 by resilient straps 5'.

The straps 5, the fabric 4, and the straps 5', are covered by upholstery 8 which is itself covered by a lining 9. The upholstery 8 is thicker at right angles to the straps 5' so as to compensate the displacement of the fabric 7 in relation to that of the fabric 4. An auxiliary cushion 10, connected with a head-rest 11 in the manner which will be described hereinunder, can engage the inner surface of the fabric 7.

Figure 6:
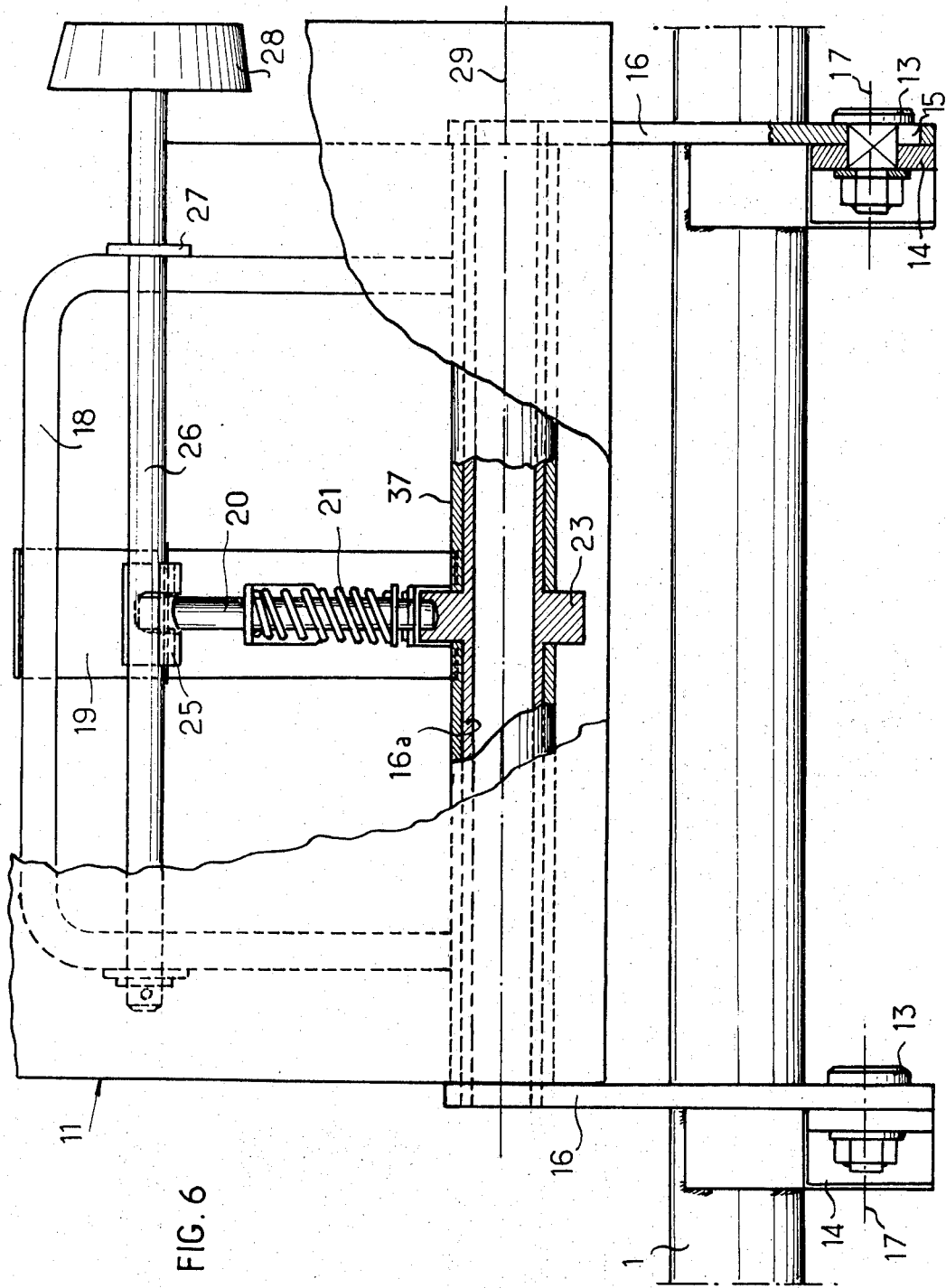
FIG. 6 is a fragmentary front elevation, to an enlarged scale, of the head-rest.

As shown in FIGS. 6 to 9, pivot pins 13 having flats 13a are carried by angle members 14 welded onto the horizontal member of the frame 1 and are engaged in openings in the angle members 14; these latter openings have flats 14a whereby the pivot pins 13 are secured against rotation. The pivot pins 13 extend through circular openings 15 of substantially the same diameter, formed at the ends of the respective legs of a stirrup 16; the circular openings 15 are longitudinally extended by openings 15a having substantially the same section as that of the flats 13a of the pivot pins 13. It will thus be seen that, when the pivot pins 13 are engaged in the circular openings 15, the stirrup 16 can pivot freely about the axis 17 of the pivot pins; on the other hand, when the flats 13a of the latter are engaged in the openings 15a, the stirrup 16 is secured against rotation in a position in which it is substantially parallel with the frame 1 projecting upwards in relation to the latter.

The stirrup 16 comprises a tubular horizontal member 16a extending between the respective legs of the stirrup 16. Two bushes 37 are rotatably mounted on the member 18a, the bushes 37 being connected together by a U-shaped frame 18 forming the supporting frame of the head-rest 11, and by a plate 19. Slidably mounted on the plate 19 is a plunger 20 which is biased inwardly by a spring 21, the inner end portion of the plunger 20 being engageable in one of a plurality of notches 22 provided on the periphery of a locking cam-wheel 23 integral with the horizontal member 16a of the stirrup 16 and arranged between the inner ends of the bushes 37. The plunger 20 carries two lateral fingers 24 which are engaged by a fork 25 integral with a shaft 26. The shaft 26 is rotatably mounted in lugs 27 fixed on the frame 18 and carrying a knob 28 at one of its ends, the knob 28 being accessible from the side of the head-rest 11.

By rotating the knob 28 it is thus possible to move the plunger 20 against the bias of the spring 21, so as to withdraw it from the notch 22 in which it was located, and to permit the head-rest to be pivoted about the axis 29 of the horizontal member 16a of the stirrup 16. When the handle 28 is released, the plunger 20 can engage into a new notch of the cam-wheel 23, which locks the head-rest in the desired angular position.

The upper edge of the cushion 10 is connected by two articulated straps 30 and two tongues 31 to the two bushes 37; its lower edge is connected to tee frame 3 by two resilient return straps 32.

Figure 5:
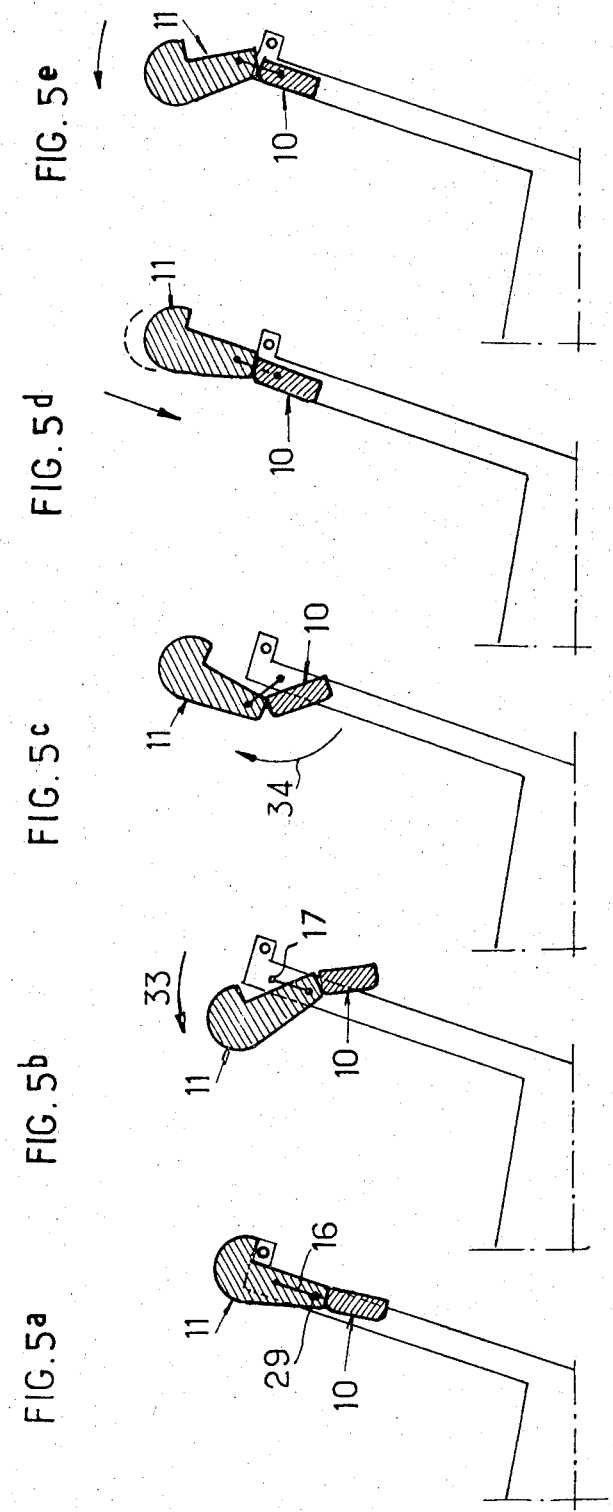
FIGS. 5a to 5e illustrate the movements of the head-rest.

In FIGS. 1 to 3 and FIG. 5a, the head-rest is shown in its lowered or retracted position, in which the cushion 10 is hidden behind the back part, and the head-rest is supported by the frame 1. In this condition, the head-rest 11 covers an opening in the upper portion of the back part. To bring the head-rest into its raised position, it is released by pivoting it about the axis 29 of the horizontal stirrup member 16a in the direction of arrow 33, as shown in FIG. 5b. Then it is raised again by pivoting the stirrup 16 about the pivot pins 13, as shown by the arrow 34 (FIG. 5c). In the course of this movement, the cushion 10, retracted behind the fabric 4, is moved along the head-rest 11 in a forward tipping movement, during which it moves simultaneously away from the edge of fabric 4 and of fabric 7 and is located within the space created by the staggered positions of the fabrics; similarly, and during this movement, the plunger 20 slides on the smooth surface portion 23a of the cam-wheel 23 as far as the level of the first notch 22a and enters this notch under the bias of the spring 21 so as to lock the head-rest 11 on the stirrup 16. At the end of the movement, the openings 15a of the stirrup 16 engage on the flats 13a under the return action of the resilient straps 32, thus locking the stirrup 16 in raised position (FIG. 5d); the cushion and the head-rest 11 then occupy the position represented in FIG. 6. At this moment it is possible to alter the inclination of the head-rest by rotating the knob 28 as shown in FIG. 5e. In these various working positions the cushion 10 covers and hides the opening in the upper portion of the back part, which opening previously effected the location of the head-rest 11.

To return the head-rest into its lowered position, it is pulled upwards to release the flats 13a from the openings 15a, and the knob 28 is operated so as to disengage the head-rest from the stirrup 16; then the stirrup 16 is pivoted forwardly and, when it has returned to its lowered position, the hedad-rest is engaged into the back part until it comes to abut against the horizontal member of the frame 1. During the pivoting movement of the stirrup, the cushion 10 is returned to the retracted position by the resilient straps 32.

What is claimed is:

1. In a seat back
means defining a central opening positioned in an upper portion thereof,
a portion movable between a lowered position in which the said movable portion covers the opening and a raised position in which the said movable portion is at least partly withdrawn from the opening to define a head-rest, and
an auxiliary cushion pivotally connected to the said movable portion, the said auxiliary cushion being retracted behind the seat back when the said movable portion is in its lowered position and said auxiliary cushion filling the opening when the said movable portion is in its raised position.

2. A seat back according to claim 1 wherein the said seat back includes
a seat back base portion, and the said movable portion includes
a base portion, said seat back further comprising
means connecting an upper portion of the auxiliary cushion to the said base portion of the said movable portion, and
resilient means connecting a lower portion of the said movable portion to the said seat back base portion.

3. A seat back according to claim 1 further comprising
first supporting means pivotally mounted on the seat back,
second supporting means pivotally mounted on the first supporting means, said second supporting means carrying the said movable portion,
first locking means locking the first supporting means against rotation relative to the seat back when the said movable portion is in its raised position, and
second locking means locking the second supporting means against rotation relative to the first supporting means when the said movable portion is in its raised position.

4. A seat back according to claim 3 in which the second locking means locks the second supporting means in a selected one of a plurality of angular positions.

5. In a seat back
means defining a central opening positioned in an upper portion thereof,
a portion movable between a lowered position in which the said movable portion covers the opening and a raised position in which the said movable portion is at least partly withdrawn from the opening to define a head-rest,
an auxiliary cushion connected to the said movable portion, the said auxiliary cushion being retracted behind the seat back when the said movable portion is in its lowered position and said auxiliary cushion covering the opening when the said movable portion is in its raised position,
first supporting means pivotally mounted on the seat back,
second supporting means pivotally mounted on the first supporting means, said second supporting means carrying the said movable portion,
first locking means locking the first supporting means against rotation relative to the seat back when the said movable portion is in its raised position, and
second locking means locking the second supporting means against rotation relative to the first supporting means when the said movable portion is in its raised position.

6. A seat back according to claim 5 wherein the said seat back includes
a seat back base portion, and the said movable portion includes
a base portion, said seat back further comprising
means connecting an upper portion of the auxiliary cushion to the said base portion of the said movable portion, and
resilient means connecting a lower portion of the said movable portion to the said seat back base portion.

7. A seat back according to claim 5 in which the second locking means locks the second supporting means in a selected one of a plurality of angular positions.

* * * * *